(No Model.) 2 Sheets—Sheet 1.
J. WELLER.
Thrashing, Separating, and Cleaning Machine.
No. 235,187. Patented Dec. 7, 1880.
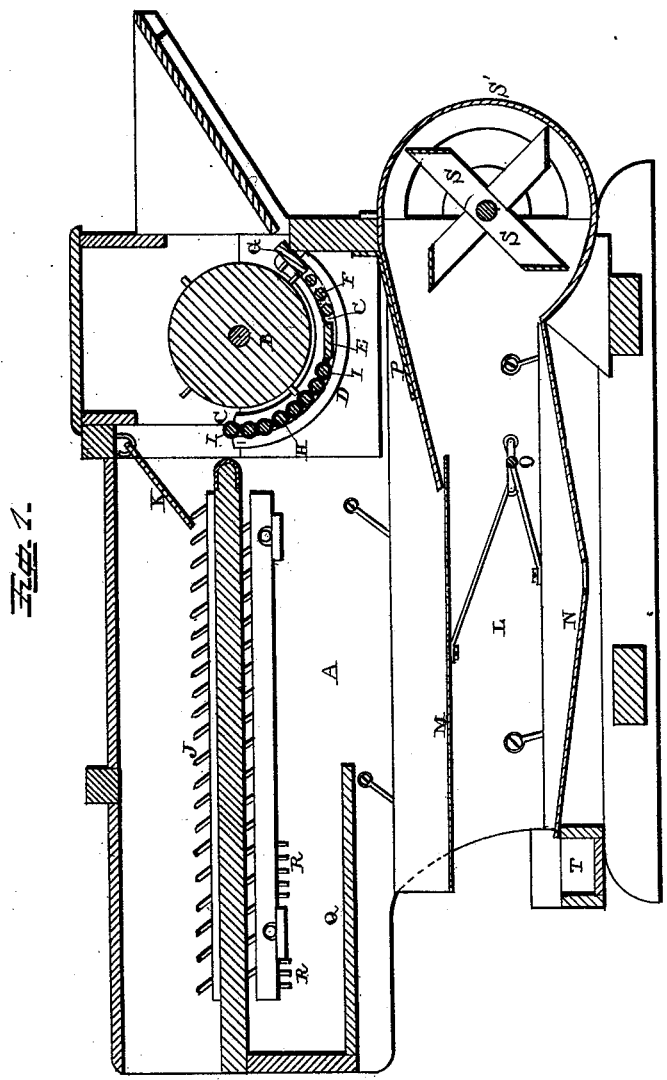

(No Model.) 2 Sheets—Sheet 2.
J. WELLER.
Thrashing, Separating, and Cleaning Machine.
No. 235,187. Patented Dec. 7, 1880.
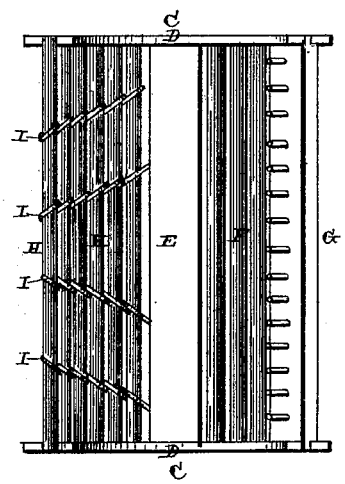

UNITED STATES PATENT OFFICE.

JOHN WELLER, OF FUNKSTOWN, MARYLAND.

THRASHING, SEPARATING, AND CLEANING MACHINE.

SPECIFICATION forming part of Letters Patent No. 235,187, dated December 7, 1880.

Application filed October 7, 1880. (No model.)

*To all whom it may concern:*

Be it known that I, JOHN WELLER, of Funkstown, in the county of Washington and State of Maryland, have invented certain new and useful Improvements in Thrashing, Separating, and Cleaning Machines; and I do hereby declare the following to be a full, clear, and exact description of the invention, such as will enable others skilled in the art to which it pertains to make and use it, reference being had to the accompanying drawings, which form part of this specification.

My invention relates to an improvement in cylinder thrashing, separating, and cleaning machines; and it consists, first, in forming the concave in front of its center of metallic rods, which are separated a suitable distance apart to let the grain fall freely through by means of wires which are wrapped around them, and which wires serve as guides for the straw in moving toward the carrier, and thus prevent it from passing through the rods; second, in forming the concave of a series of metallic rods, a smooth central strip, and a toothed strip, and making the parts removable, so that they can be placed in any desired relation to each other, as will be more fully described hereinafter.

Figure 1 is a vertical longitudinal section of a machine embodying my invention. Fig. 2 is a plan view of the concave.

A represents the frame of my machine, which may be of any shape, form, or construction that may be preferred. The cylinder B is journaled in the rear end of the machine, in the usual manner, over the top of the concave C. This concave is formed principally of metallic rods which are held in position by means of the circular concave hangers D. Instead of having this concave made in one solid continuous piece, the rods which form the rear end of the concave, where the grain is fed in, are placed loosely in the hangers, so that they can be readily removed when it is desired to vary the form of the concave, according to the kind of grain that is to be thrashed. In the center of the concave is placed a smooth wooden strip, E, and to rear of this wooden strip E are the removable rods F, and to the rear of these removable rods is placed the toothed strip G. All three of these parts can be changed at will, so that the smooth strip and the toothed strip can be placed side by side, or the toothed strip can be placed directly under the center of the cylinder, as may be required. The front part of this concave is formed of the metallic rods H, which have two or more wires, I, wrapped around them at suitable distances apart, and which wires serve the double purpose of holding the rods far enough apart to allow the grain to pass freely through them and to guide the straw in its upward movement, so that the straw shall not be forced in between the rods. These rods, being arranged in the manner here shown, form the largest separating-surface to the concave that can possibly be given.

The straw is moved directly upward toward the straw-carrier J, which may be of any suitable construction, and which carrier has its rear end in direct connection with the concave, so that the straw is carried immediately upon the concave without the intervention of endless aprons, carriers, or other such devices as are generally employed for this purpose.

Loosely hung or pivoted just above the front end of the concave and extending over the rear end of the straw-carrier is a compressor, K, which consists of a flat board or sheet of metal, and which bears down upon the straw with sufficient force to compress it just enough to enable the teeth of the rakes to take hold of it and draw it directly from the concave. Were this compressor K not used the straw would have a tendency to wrap around the cylinder or pack in the concave without being carried directly away, as is the case where the condenser is used.

All the grain which is separated from the straw falls directly through the separated rods, which form the front ends of the concave, and fall directly upon the shoe L, without having some intervening devices of some kind to carry the grain to the shoe, as is generally the case.

In the upper part of the shoe is placed the usual wire screen M, and under this screen is the bottom N, which gathers the grain and conducts it to the conveyer. These two parts—the wire screen and the bottom which form this shoe—are connected by suitable rods with a double-cranked shaft, O, by means of which the screen and the bottom are made to move in opposite directions at the same time. By thus having the two parts move in opposite directions they counterbalance each other, so that there is no endwise movement to the frame.

Under the whole of the concave is placed a sheet-metal guide, P, which extends forward over the rear end of the shoe and conducts all of the grain which may fall through the rear end of the concave directly upon the shoe. Placed in the front end of the machine is a shelf or table, Q, which extends backward a suitable distance under the straw-carrier, and upon which any grain falls which has been carried along with the straw. Projecting downward from the under side of each one of the rake-bars of the carrier is a series of teeth, R, which serve to brush all of the grain which falls upon this table back upon the wire screen of the shoe.

The covering S' for the fan S, instead of being made just long enough to cover the outer portion of the fan, is here extended both above and below far enough into the machine to prevent any draft from the fan from being lost or striking the grain until it drops upon the wire screen.

At the rear end of the machine is placed a trough or receptacle, T, into which the tailings fall, and from which it is carried up through the usual elevator into the concave, to again be acted upon by the cylinder. The bolts or gearing by which the different parts of this machine are operated may be arranged in any suitable manner.

It will be seen from the construction above described that all endless belts and carriers have been dispensed with, and that the grain falls directly from the concave upon the shoe, and that the straw is taken directly from the front end of the concave by the straw-carrier, thus dispensing with a number of the parts which are generally used in the construction of thrashing and separating machines, and whereby the construction of the machine is greatly simplified, its cost correspondingly decreased, less power required for operating the machine, and its efficiency increased in every way.

Having thus described my invention, I claim—

1. A concave formed of metallic rods, a smooth central strip, and a toothed strip, in combination with the revolving toothed cylinder, the parts of the concave being made removable, so that they can be placed in any desired relation to each other, substantially as shown.

2. In a concave, the metallic rods secured together by means of wires, which wires serve the double purpose of separating the rods and guiding the straw to the carrier, substantially as described.

In testimony that I claim the foregoing I have hereunto set my hand this 4th day of October, 1880.

JOHN WELLER.

Witnesses:
F. A. LEHMANN,
C. S. DRURY.